US009681044B2

(12) United States Patent
Homma

(10) Patent No.: US 9,681,044 B2
(45) Date of Patent: Jun. 13, 2017

(54) IMAGING DEVICE, IMAGING METHOD, AND COMPUTER-READABLE RECORDING MEDIUM TO SHOW SUPER-RESOLUTION IMAGE ON LIVE VIEW IMAGE

(71) Applicant: Olympus Corporation, Shibuya-ku, Tokyo (JP)

(72) Inventor: Shinsuke Homma, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/959,947

(22) Filed: Dec. 4, 2015

(65) Prior Publication Data

US 2016/0171655 A1      Jun. 16, 2016

(30) Foreign Application Priority Data

Dec. 10, 2014   (JP) ................................. 2014-250053

(51) Int. Cl.
*H04N 5/232* (2006.01)
*G06T 3/40* (2006.01)

(52) U.S. Cl.
CPC ....... *H04N 5/23232* (2013.01); *G06T 3/4053* (2013.01); *H04N 5/23216* (2013.01); *H04N 5/23245* (2013.01); *H04N 5/23293* (2013.01); *H04N 5/23296* (2013.01)

(58) Field of Classification Search
USPC ...................................................... 348/240.2
See application file for complete search history.

(56) References Cited

U.S. PATENT DOCUMENTS

| 8,319,883 | B2* | 11/2012 | Hada ...................... G03B 13/00 |
| | | | 348/239 |
| 8,711,265 | B2* | 4/2014 | Kawamura ........ H04N 1/00408 |
| | | | 348/240.2 |
| 9,019,413 | B2* | 4/2015 | Ecrement ........... H04N 5/23293 |
| | | | 348/333.01 |
| 2009/0189900 | A1* | 7/2009 | Furukawa ............. G06T 3/4069 |
| | | | 345/428 |

(Continued)

FOREIGN PATENT DOCUMENTS

JP        2008-092297         4/2008

*Primary Examiner* — Shahbaz Nazrul
(74) *Attorney, Agent, or Firm* — John C. Pokotylo; Straub & Pokotylo

(57) ABSTRACT

An imaging device includes: an optical system; an imaging element that continuously generates image data of an object; a position changing unit that changes a relative positional relationship between the optical system and the imaging element; a touch panel that detects a contact position thereon, and periodically outputs a position signal according to the contact position; a position controller that controls the position changing unit based on duration of maintaining the contact position to change the positional relationship; a trimming unit that generates pieces of trimming image data by sequentially cutting out an area including a touch position corresponding to the position signal from an image corresponding to the image data each time the positional relationship is changed; and a super-resolution processer that performs pixel interpolation using the pieces of trimming image data to generate super-resolution image data having a higher resolution than that of each trimming image data.

5 Claims, 6 Drawing Sheets

(56) References Cited

U.S. PATENT DOCUMENTS

| | | | |
|---|---|---|---|
| 2009/0201316 A1* | 8/2009 | Bhatt | G06F 9/4443 345/660 |
| 2010/0214449 A1* | 8/2010 | Shimizu | H04N 5/23212 348/240.2 |
| 2011/0273471 A1* | 11/2011 | Nagasaka | H04N 5/23212 345/619 |
| 2012/0262490 A1* | 10/2012 | Niemi | G06F 3/041 345/660 |
| 2013/0093922 A1* | 4/2013 | Mowry | G03B 17/00 348/239 |
| 2013/0155308 A1* | 6/2013 | Wu | G06T 3/00 348/333.05 |
| 2016/0112627 A1* | 4/2016 | Ono | H04N 5/23212 382/255 |

* cited by examiner

IMAGING DEVICE, IMAGING METHOD, AND COMPUTER-READABLE RECORDING MEDIUM TO SHOW SUPER-RESOLUTION IMAGE ON LIVE VIEW IMAGE

CROSS-REFERENCE TO RELATED APPLICATIONS

This application is based upon and claims the benefit of priority from Japanese Patent Application No. 2014-250053, filed on Dec. 10, 2014, the entire contents of which are incorporated herein by reference.

BACKGROUND

1. Technical Field

The disclosure relates to an imaging device and method for imaging an object to generate image data of the object, and a computer-readable recording medium.

2. Related Art

In recent years, there has been known a technique of generating a high resolution image on an imaging device such as a digital camera by using a plurality of low resolution images that have been captured (see Japanese Laid-open Patent Publication No. 2008-92297). In this technique, by performing high resolution processing only on a predetermined area before performing the high resolution processing on a whole area of an image displayed on a display unit, it is possible to grasp a degree of high resolution of the image displayed on the display unit.

SUMMARY

In some embodiments, an imaging device includes: an optical system configured to image an object; an imaging element configured to receive light of an object image of the object formed by the optical system and to continuously generate image data of the object; a position changing unit configured to change a relative positional relationship between the optical system and the imaging element relative to a surface orthogonal to an optical axis of the optical system; a display unit configured to display an image corresponding to the image data generated by the imaging element; a touch panel that is provided so as to overlap on a display area of the display unit and is configured to detect a contact position where an external body touches the touch panel and to periodically output a position signal according to the contact position; a position controller configured to control the position changing unit based on a period of time during which the contact position is maintained, and thereby to change the relative positional relationship between the optical system and the imaging element per a predetermined distance; a trimming unit configured to generate a plurality of pieces of trimming image data by sequentially cutting out an area including a touch position corresponding to the position signal from the image corresponding to the image data sequentially generated by the imaging element each time the relative positional relationship between the optical system and the imaging element is changed; and a super-resolution processer configured to perform pixel interpolation using the plurality of pieces of trimming image data sequentially generated by the trimming unit, and thereby to generate super-resolution image data having a higher resolution than a resolution of each trimming image data.

In some embodiments, an imaging method executed by an imaging device is provided. The imaging device includes: an optical system configured to image an object; an imaging element configured to receive light of an object image of the object formed by the optical system and to continuously generate image data of the object; a position changing unit configured to change a relative positional relationship between the optical system and the imaging element relative to a surface orthogonal to an optical axis of the optical system; a display unit configured to display an image corresponding to the image data generated by the imaging element; and a touch panel that is provided so as to overlap on a display area of the display unit and is configured to detect a contact position where an external body touches the touch panel and to periodically output a position signal according to the contact position. The method includes: controlling the position changing unit based on a period of time during which the contact position is maintained to change the relative positional relationship between the optical system and the imaging element per a predetermined distance; generating a plurality of pieces of trimming image data by sequentially cutting out an area including a touch position corresponding to the position signal from the image corresponding to the image data sequentially generated by the imaging element each time the relative positional relationship between the optical system and the imaging element is changed; and performing pixel interpolation using the plurality of pieces of trimming image data to generate super-resolution image data having a higher resolution than a resolution of each trimming image data.

In some embodiments, a non-transitory computer-readable recording medium with an executable program stored thereon is provided. The program instructs an imaging device including: an optical system configured to image an object; an imaging element configured to receive light of an object image of the object formed by the optical system and to continuously generate image data of the object; a position changing unit configured to change a relative positional relationship between the optical system and the imaging element relative to a surface orthogonal to an optical axis of the optical system; a display unit configured to display an image corresponding to the image data generated by the imaging element; and a touch panel that is provided so as to overlap on a display area of the display unit and is configured to detect a contact position where an external body touches the touch panel and to periodically output a position signal according to the contact position, to execute: controlling the position changing unit based on a period of time during which the contact position is maintained to change the relative positional relationship between the optical system and the imaging element per a predetermined distance; generating a plurality of pieces of trimming image data by sequentially cutting out an area including a touch position corresponding to the position signal from the image corresponding to the image data sequentially generated by the imaging element each time the relative positional relationship between the optical system and the imaging element is changed; and performing pixel interpolation using the plurality of pieces of trimming image data to generate super-resolution image data having a higher resolution than a resolution of each trimming image data.

The above and other features, advantages and technical and industrial significance of this invention will be better understood by reading the following detailed description of presently preferred embodiments of the invention, when considered in connection with the accompanying drawings.

DETAILED DESCRIPTION

Hereinafter, modes for carrying out the invention (hereinafter, referred to as the "embodiment(s)") will be described with reference to the drawings. The present invention is not to be limited by the embodiments below. Each of the drawings referenced in the description below only schematically illustrates a shape, a size, and a positional relationship to the extent that contents of the invention can be understood. That is, the present invention is not to be limited only to the shape, the size, and the positional relationship exemplified in each of the drawings.

Configuration of Imaging Device

Figure 1:
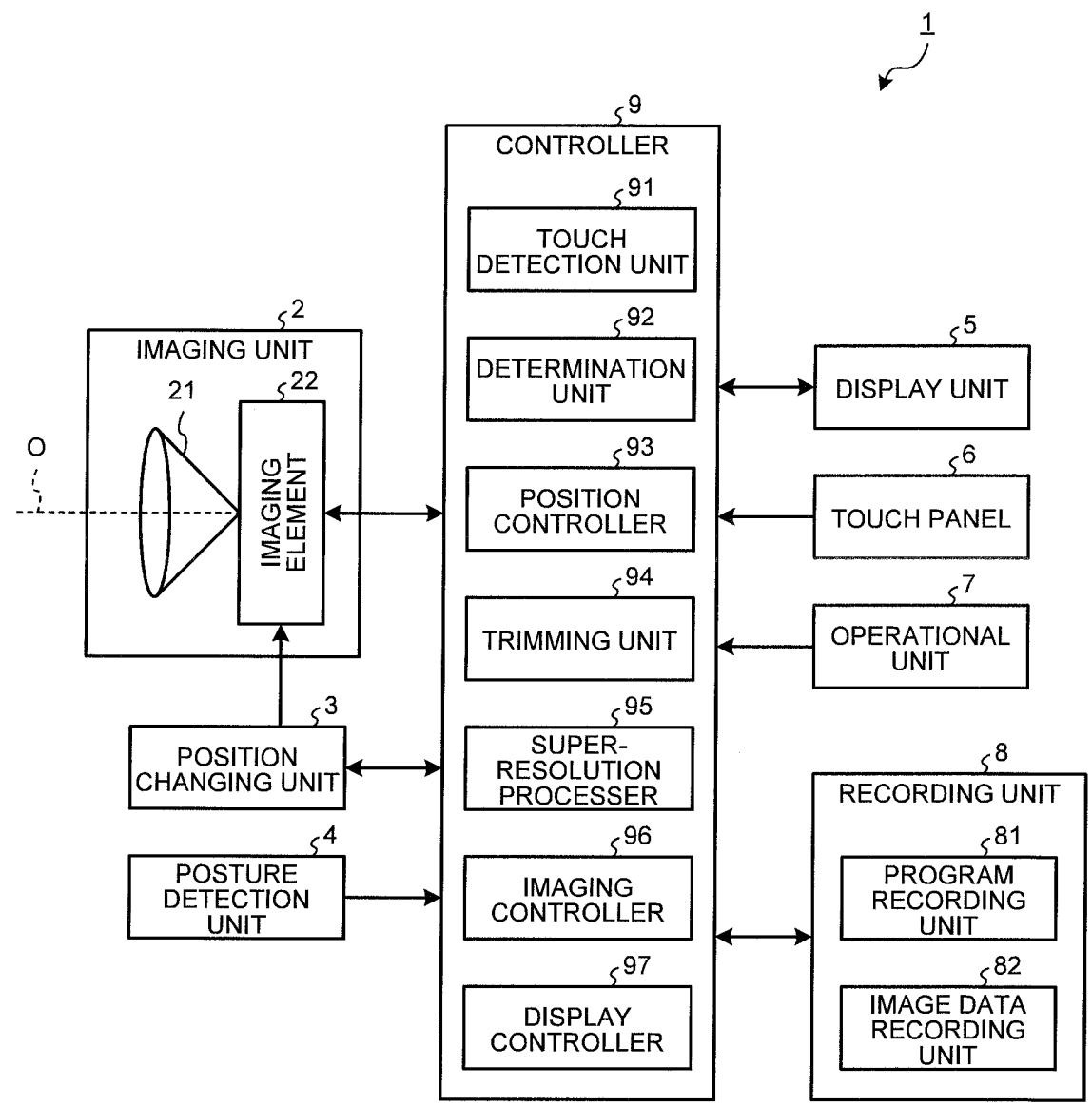
FIG. 1 is a block diagram illustrating a functional configuration of an imaging device according to one embodiment of the present invention.

FIG. 1 is a block diagram illustrating a functional configuration of the imaging device according to one embodiment of the present invention. An imaging device 1 illustrated in FIG. 1 includes an imaging unit 2, a position changing unit 3, a posture detection unit 4, a display unit 5, a touch panel 6, an operational unit 7, a recording unit 8, and a controller 9.

The imaging unit 2 includes an optical system 21 for forming an object image of an object, and an imaging element 22 for generating image data of the object image by imaging the object image that has been formed by the optical system 21. The optical system 21 has one or more lenses, and captures an image of the object. The imaging element 22 has an imaging sensor such as a charge coupled device (CCD) or a complementary metal oxide semiconductor (CMOS), and receives light of the object image of the object that has been formed by the optical system 21 and continuously generates the image data of the object.

The position changing unit 3 holds the imaging element 22. Under control of the controller 9, the position changing unit 3 relatively changes a positional relationship between the optical system 21 and the imaging element 22 by moving the imaging element 22 relative to a surface orthogonal to an optical axis O (horizontal direction and vertical direction). The position changing unit 3 has a voice coil motor, a piezoelectric element, and the like. The position changing unit 3 functions as a hand shake prevention mechanism that prevents a hand shake occurs in the imaging device 1.

The posture detection unit 4 detects a posture of the imaging device 1 and outputs a detected result to the controller 9. The posture detection unit 4 has a gyro sensor and the like.

Under the control of the controller 9, the display unit 5 displays an image corresponding to the image data generated by the imaging unit 2. The display unit 5 has a display panel including a liquid crystal, an organic electro luminescence (EL), or the like.

The touch panel 6 is provided so as to be overlapped on a display screen of the display unit 5, and detects a contact position (touch position) where a body from outside has contacted as well as receives input of a signal according to the detected position. The touch panel 6 periodically outputs a signal according to the contact position where the body from the outside has contacted to the controller 9. Any of a resistance film method, an electrostatic capacitance method, an optical method, and the like is applicable as a method for the touch panel 6.

The operational unit 7 receives input of various operations from the imaging device 1. The operational unit 7 has, for example, a power supply switch that turns a power supply of the imaging device 1 on and off, a zoom switch that changes a zoom magnification of the optical system 21, a mode change switch that changes a mode of the imaging device 1, a release switch that instructs the imaging device 1 to capture an image, and the like.

The recording unit 8 includes a program recording unit 81 that records various programs executed by the imaging device 1 and an image data recording unit 82 that records the image data generated by the imaging unit 2. The recording unit 8 has a flash memory, a synchronous dynamic random access memory (SDRAM), a memory card, and the like.

The controller 9 integrally controls each unit constituting the imaging device 1. The controller 9 has a central processing unit (CPU) and the like. The controller 9 includes a touch detection unit 91, a determination unit 92, a position controller 93, a trimming unit 94, a super-resolution processer 95, an imaging controller 96, and a display controller 97.

The touch detection unit 91 detects the touch position on the touch panel 6 based on the signal that has been input from the touch panel 6. For example, based on the position signal periodically input from the touch panel 6, the touch detection unit 91 detects the touch position on the touch panel 6 as well as detects a temporal change of the touch position.

Based on a posture signal indicating a posture of the imaging device 1 input from the posture detection unit 4, the determination unit 92 determines whether or not blurring occurs in the imaging device 1. Based on super-resolution image data generated by the super-resolution processer 95, the determination unit 92 further determines whether or not the number of pixels of a super-resolution image corresponding to the super-resolution image data generated by the super-resolution processer 95 exceeds a resolution of the optical system 21. The determination unit 92 may determine that the number of pixels of the super-resolution image exceeds the resolution of the optical system 21 when data volume of the super-resolution image data generated by the super-resolution processer 95 exceeds a predetermined value.

The position controller 93 drives the position changing unit 3 to move the imaging element 22 based on a period of time during which the contact position on the touch panel 6 is maintained (for example, a period of time of touching or duration of maintaining the touch position). Specifically, while the contact position on the touch panel 6 is maintained, the position controller 93 drives the position changing unit 3 to change a relative positional relationship between the optical system 21 and the imaging element 22 by moving the imaging element 22 by a predetermined very small amount such as by every other 0.5 pixels such that the number of pixels virtually increases.

Based on the position signal input from the touch panel 6, the trimming unit 94 sequentially cuts out an area including the touch position from the image displayed on the display unit 5 to generate a plurality of pieces of trimming image data. Specifically, the trimming unit 94 generates the trimming image data by sequentially cutting out, from the image displayed on the display unit 5, the area including the touch position that is, for example, a rectangular area smaller than a display area displayed on the display unit 5 and including the area of the touch position.

The super-resolution processor 95 generates the super-resolution image data by using the plurality of pieces of trimming image data sequentially generated by the trimming unit 94. Specifically, the super-resolution processor 95 generates the super-resolution image data by pixel interpolating using, for example, the plurality of pieces of trimming image data with low resolution. Here, a resolution of the super-resolution image corresponding to the super-resolution image data is higher than a resolution of the image corresponding to the image data generated by the imaging unit 2.

The imaging controller 96 controls imaging by the imaging unit 2. Specifically, when a release signal for instructing image capturing is input from the operational unit 7, the imaging controller 96 causes the imaging unit 2 to execute the image capturing.

The display controller 97 controls a display mode of the display unit 5. The display controller 97 causes various information related to the imaging device 1 to be displayed on the display unit 5. According to duration of the position signal output from the touch panel 6, the display controller 97 causes the super-resolution image corresponding to the super-resolution image data generated by the super-resolution processer 95 to be enlarged and displayed on the display unit 5. Specifically, when the image displayed on the display unit 5 is touched and the super-resolution processer 95 generates the super-resolution image data, the display controller 97 enlarges and displays the super-resolution image corresponding to the super-resolution image data generated by the super-resolution processer 95 on the display unit 5 according to the duration of the position signal output from the touch panel 6. For example, when the position signal output from the touch panel 6 is stopped or a predetermined time (for example, one second) has passed since the position signal is stopped, the display controller 97 causes the super-resolution image corresponding to the super-resolution image data generated by the super-resolution processer 95 to be enlarged and displayed on the display unit 5 in place of a live view image or a playback image displayed on the display unit 5.

Processing by Imaging Device

Figure 2:
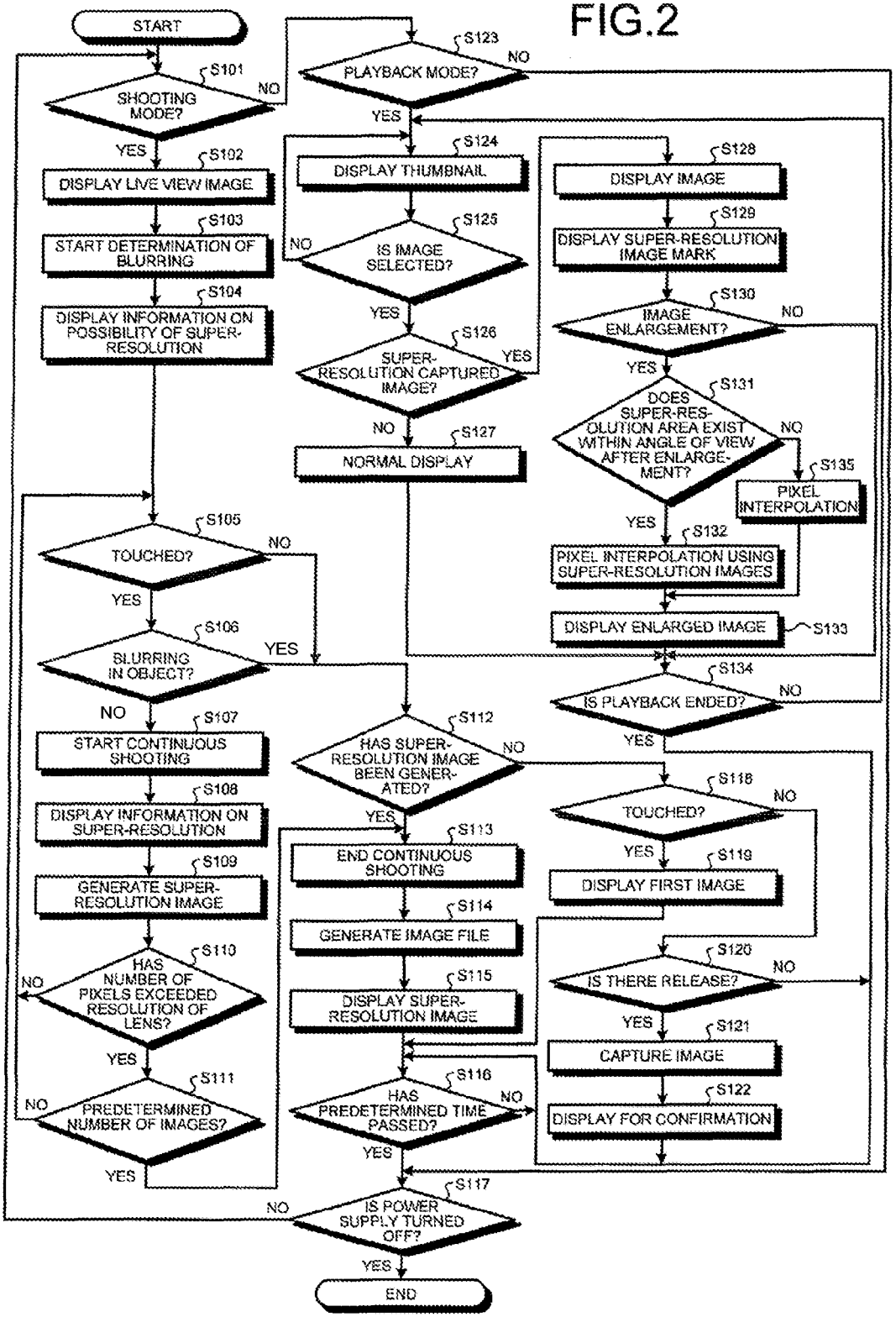
FIG. 2 is a flowchart illustrating an outline of processing executed by the imaging device according to one embodiment of the present invention.

Next, reference will be made to processing executed by the imaging device 1. FIG. 2 is a flowchart illustrating an outline of the processing executed by the imaging device 1.

Figure 3:
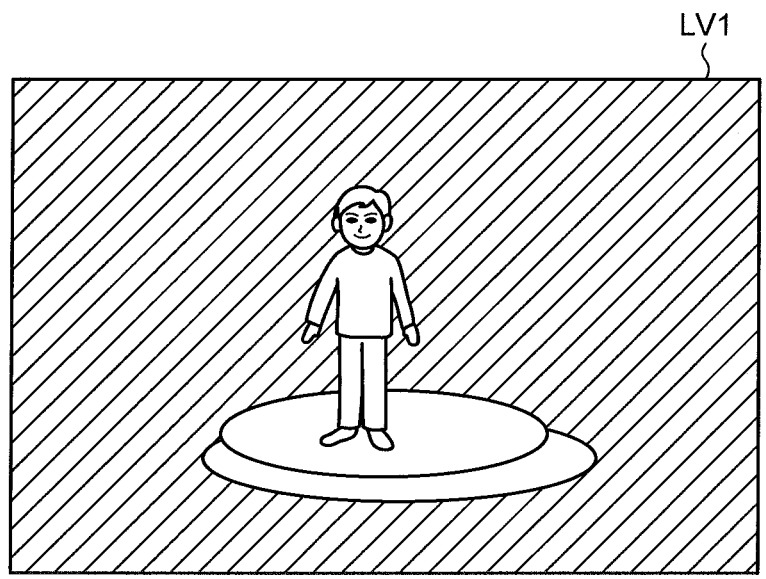
FIG. 3 is a view illustrating an exemplary live view image displayed on a display unit of the imaging device according to one embodiment of the present invention.

As illustrated in FIG. 2, first, reference will be made to a case in which the imaging device 1 is set to a shooting mode (step S101: Yes). In this case, the display controller 97 causes the live view image corresponding to the image data generated by the imaging unit 2 to be displayed on the display unit 5 (step S102). For example, as illustrated in FIG. 3, the display controller 97 causes a live view image LV1 corresponding to the image data generated by the imaging unit 2 to be displayed on the display unit 5.

Subsequently, the determination unit 92 starts determination of blurring whether the blurring occurs in the imaging device 1 (step S103). Specifically, based on the posture signal input from the posture detection unit 4, the determination unit 92 starts the determination of blurring whether or not the blurring occurs in the imaging device 1. The determination unit 92 may also make the determination of blurring whether or not the blurring occurs in the imaging device 1 based on two temporally adjacent image data generated by the imaging unit 2.

Then, based on a determination result by the determination unit 92, the display controller 97 causes the display unit 5 to display information on possibility of super-resolution on the live view image LV1 (step S104). Specifically, if the determination unit 92 determines that the blurring does not occur in the imaging device 1, the display controller 97 displays an icon indicating that super-resolution is possible on the live view image LV1. On the other hand, if the determination unit 92 determines that the blurring occurs in the imaging device 1, the display controller 97 causes information indicating that the super-resolution is not possible, for example, an icon for a message urging to use a tripod since the blurring occurred in the imaging device 1 is large, to be displayed on the display unit 5.

Subsequently, when the touch panel 6 is touched (step S105: Yes), the determination unit 92 determines whether or not blurring occurs in the object (step S106). Specifically, based on two temporally preceding and following image data generated by the imaging unit 2, the determination unit 92 determines whether or not the blurring occurs in the object. The determination unit 92 may also determine whether or not the object is a moving body based on the two temporally preceding and following image data generated by the imaging unit 2 and, if the object is the moving body, the determination unit 92 may determine that the blurring occurs in the object. If the determination unit 92 determines that the blurring occurs in the object (step S106: Yes), the imaging device 1 proceeds to step S112 described below. In contrast, if the determination unit 92 determines that the blurring does not occur in the object (step S106: No), the imaging device 1 proceeds to step S107 described below.

In step S107, the imaging controller 96 starts continuous shooting by the imaging unit 2 (step S107). In this case, the position controller 93 moves the imaging element 22 in a horizontal direction and a vertical direction relative to a surface orthogonal to the optical system 21 so as to move by a predetermined pixel centering on the touch position, which corresponds to the signal input from the touch panel 6. Accordingly, only the blurring in a specific area should be taken care of, whereby a success rate is increased. For example, to pixel interpolate between pixels in the super-resolution, each time the imaging unit 2 performs imaging, the position controller 93 moves the imaging element 22 such that move between the pixels is gradually reduced or in four or eight different directions (for example, from 0.5 pixels to 0.2 pixels, or horizontally, vertically, and to the lower right and the upper right, and the like). In addition, if the number of captured images is denoted by M and pixel magnification is denoted by N, the imaging controller 96 determines the number of the images to be continuously shot by the imaging device 1 by the following formula (1).

$$M = (N^{-0.5} \times 2)^{-2}/2 = 2N \qquad (1)$$

Figure 4:
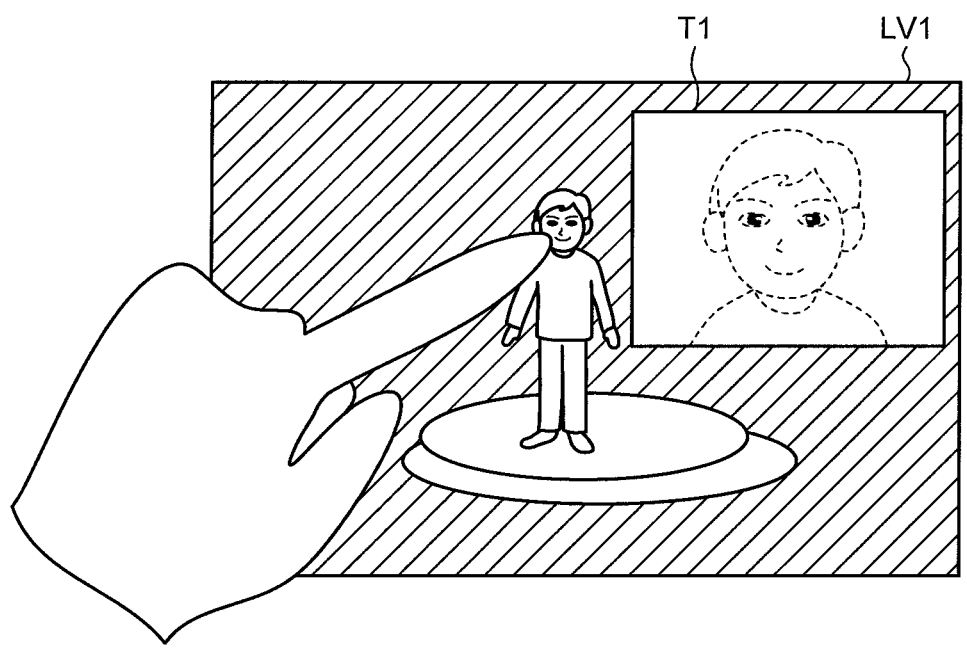
FIG. 4 is a view illustrating an exemplary image displayed on the display unit of the imaging device according to one embodiment of the present invention.

Subsequently, the display controller 97 causes the display unit 5 to display information indicating that the imaging device 1 is performing super-resolution processing such that the information is superimposed on the live view image LV1 (step S108). Specifically, as illustrated in FIG. 4, the display controller 97 causes the display unit 5 to display an icon T1 indicating that the imaging device 1 is performing the super-resolution processing such that the icon is superimposed on the live view image LV1. In place of the icon T1, the display controller 97 may also cause the display unit 5 to display a character, a figure, and the like to indicate that the imaging device 1 is performing the super-resolution processing.

Subsequently, the imaging device 1 generates a super-resolution image of the area including the touch position corresponding to the signal input from the touch panel 6 (step S109). Specifically, from the image corresponding to the image data sequentially generated by the imaging unit 2, the trimming unit 94 sequentially cuts out the area including the touch position corresponding to the signal input from the touch panel 6 and generates a plurality of trimming images. At the same time, by using the plurality of trimming images sequentially generated by the trimming unit 94, the super-resolution processer 95 generates the super-resolution image data of the area including the touch position by pixel interpolating pixels in an area with insufficient resolution by using pixels of the trimming images. A part (area) on which the super-resolution processing has been performed by the super-resolution processer 95 may be worth viewing in enlarged display later on. Furthermore, if trimming processing is performed later on, the part (area) on which the super-resolution processing has been performed by the super-resolution processer 95 may hold the resolution in the same way as a normal image.

Subsequently, the determination unit 92 determines whether or not the number of pixels of the super-resolution image generated by the super-resolution processer 95 exceeds the resolution of the optical system 21 (step S110). If the determination unit 92 determines that the number of pixels of the super-resolution image generated by the super-resolution processer 95 exceeds the resolution of the optical system 21 (step S110: Yes), the imaging device 1 proceeds to step S111 described below. In contrast, if the determination unit 92 determines that the number of pixels of the super-resolution image generated by the super-resolution processer 95 does not exceed the resolution of the optical system 21 (step S110: No), the imaging device 1 proceeds to step S112.

In step S111, the determination unit 92 determines whether or not the continuous shooting by the imaging unit 2 reaches the predetermined number of images. Specifically, the determination unit 92 determines whether or not the number of captured images in the continuous shooting by the imaging unit 2 reaches the number of captured images calculated by the imaging controller 96 in step S107 described above. If the determination unit 92 determines that the continuous shooting by the imaging unit 2 reaches the predetermined number of images (step S111: Yes), the imaging device 1 proceeds to step S112 described below. In contrast, if the determination unit 92 determines that the continuous shooting by the imaging unit 2 does not reach the predetermined number of images (step S111: No), the imaging device 1 proceeds to step S105 described above.

In step S105, if the touch panel 6 is not touched (step S105: No), the imaging device 1 proceeds to step S112 described below. The condition that the touch panel 6 is not touched also includes a case where fingers are away from the panel.

Subsequently, if the super-resolution image has already been generated by the super-resolution processer 95 (step S112: Yes), the imaging controller 96 ends the continuous shooting by the imaging unit 2 (step S113). In this case, the display controller 97 may display, on the display unit 5, a character, a figure, and the like to indicate that generation of the super-resolution image has been ended or to indicate that the number of pixels of the super-resolution image exceeds the resolution of the optical system 21.

Figure 5:
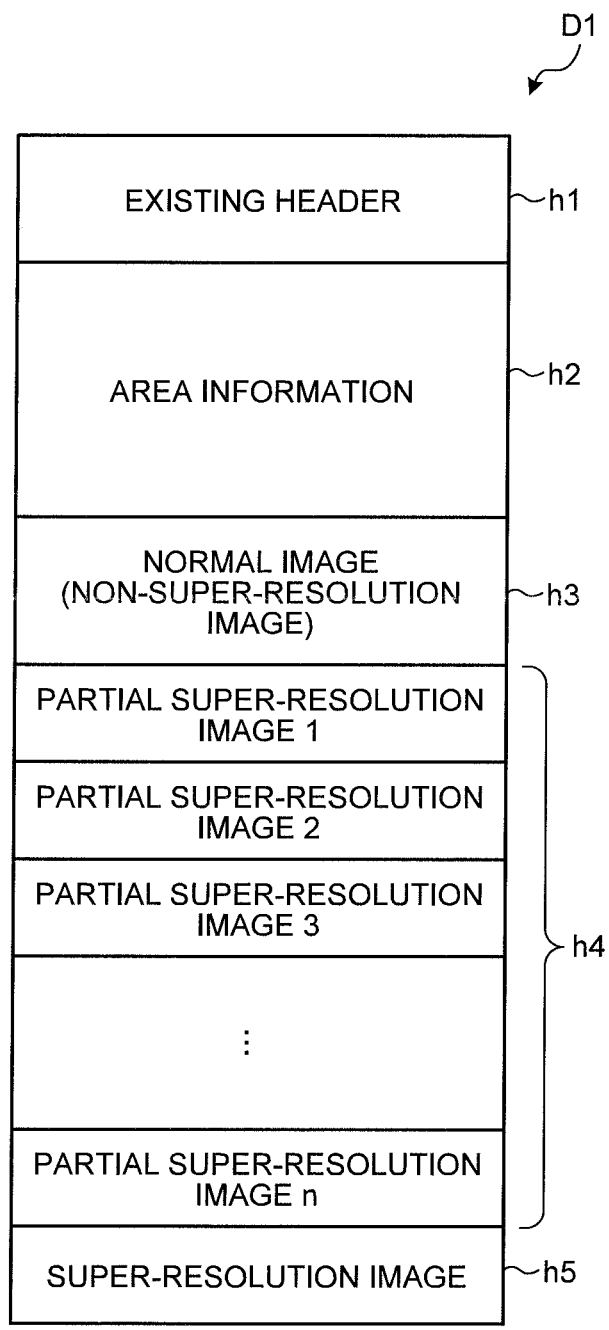
FIG. 5 is a view schematically illustrating a structure of an image file generated by the imaging device according to one embodiment of the present invention.

Subsequently, the imaging controller 96 generates an image file associating an existing header indicating various information, area information including the touch position on the touch panel 6 detected by the touch detection unit 91, a normal image (non-super-resolution image) corresponding to the image data generated by the imaging unit 2, a plurality of pieces of trimming image data of a partial super-resolution image generated by the trimming unit 94, and the super-resolution image data generated by the super-resolution processer 95, and the imaging controller 96 records it in the recording unit 8 (step S114). Specifically, as illustrated in FIG. 5, the imaging controller 96 generates an image file D1 associating an existing header h1 indicating various information, area information h2 including the touch position on the touch panel 6 detected by the touch detection unit 91, a normal image (non-super-resolution image) h3 corresponding to the image data generated by the imaging unit 2, a plurality of pieces of trimming image data h4 of the partial super-resolution image generated by the trimming unit 94, and super-resolution image data h5 generated by the super-resolution processer 95, and the imaging controller 96 records it in the recording unit 8.

Figure 6:
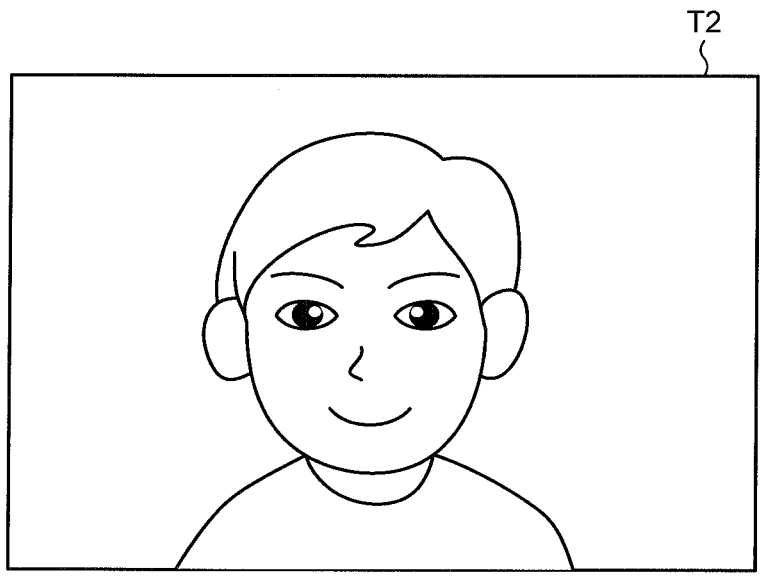
FIG. 6 is a view illustrating an exemplary super-resolution image displayed on the display unit of the imaging device according to one embodiment of the present invention.

Then, the display controller 97 enlarges and displays the super-resolution image generated by the super-resolution processer 95 on a full-screen area of the display unit 5 (step S115). Specifically, as illustrated in FIG. 6, the display controller 97 enlarges and displays a super-resolution image T2 generated by the super-resolution processer 95 on the full-screen area of the display unit 5. Accordingly, a user can check the super-resolution image T2. While checking, the user can also select a desired resolution depending on length of time of touching (i.e., duration of maintaining the touch position). The longer the length of time of touching (i.e., the longer the duration of maintaining the touch position) is, the higher the resolution of the image becomes to be worth viewing and enlarged display. Thus, the display controller 97 may enlarge and display the super-resolution image corresponding to the super-resolution image data each time the super-resolution image data is generated in the super-resolution processing by the super-resolution processer 95. Accordingly, the user can stop touch operation while checking an effect of the super-resolution processing by the super-resolution processer 95. In this embodiment, it is not necessary for the imaging device 1 to stop the continuous shooting by the imaging unit 2 at an end of the touch (stop of the position signal from the touch panel 6), and the continuous shooting may be continued as necessary even after the end of the touch. while maintaining the touch position, the trimming unit 94 may gradually enlarge a trimming area to be cut out from the image corresponding to the image data generated by the imaging element 22.

Then, when a predetermined time has passed since the image has been displayed on the display unit 5 (for example, three seconds) (step S116: Yes), the imaging device 1 proceeds to step S117 described below. In contrast, if the predetermined time has not passed since the image has been displayed on the display unit 5 (step S116: No), the imaging device 1 continues this determination.

Subsequently, when the imaging device 1 is turned off through the operational unit 7 (step S117: Yes), the imaging device 1 ends this processing. In contrast, if the imaging device 1 is not turned off through the operational unit 7 (step S117: No), the imaging device 1 returns to step S101 described above.

If the super-resolution image has not been generated by the super-resolution processer 95 in step S112 (step S112: No), the imaging device 1 proceeds to step S118 described below.

Subsequently, if the touch panel 6 has been touched (step S118: Yes), the display controller 97 displays a first image on the display unit 5 (step S119). Specifically, the display controller 97 displays an image corresponding to the image data generated by the imaging unit 2 as the first image on the display unit 5. After step S119, the imaging device 1 proceeds to step S116.

In step S118, if the touch panel 6 has not been touched (step S118: No), the imaging device 1 proceeds to step S120.

Subsequently, if there is a release signal for instructing the image capturing from the operational unit 7 (step S120: Yes), the imaging controller 96 causes the imaging unit 2 to execute the capturing of the image (step S121).

Then, the display controller 97 causes the display unit 5 to display the image corresponding to the image data generated by the imaging unit 2 for confirmation (step S122). After step S122, the imaging device 1 proceeds to step S116.

In step S120, if there is no release signal for instructing the image capturing from the operational unit 7 (step S120: No), the imaging device 1 proceeds to step S117.

Next, reference will be made to the condition that the imaging device 1 is not in the shooting mode (step S101: No) and the imaging device 1 is in a playback mode (step S123: Yes). In this case, the display controller 97 causes the display unit 5 to display a plurality of thumbnail images corresponding to a plurality of pieces of image data recorded in the image data recording unit 82 (step S124).

Subsequently, when an image is selected from the plurality of thumbnail images displayed on the display unit 5 through the operational unit 7 or the touch panel 6 (step S125: Yes), the imaging device 1 proceeds to step S126 described below. In contrast, if the image is not selected from the plurality of thumbnail images displayed on the display unit 5 through the operational unit 7 or the touch panel 6 (step S125: No), the imaging device 1 returns to step S124.

In step S126, if the image selected through the operational unit 7 or the touch panel 6 is a super-resolution captured image (step S126: Yes), the imaging device 1 proceeds to step S128 described below. In contrast, if the image selected through the operational unit 7 or the touch panel 6 is not the super-resolution captured image (step S126: No), the imaging device 1 proceeds to step S127 described below.

In step S127, the display controller 97 performs normal display in which the image selected through the operational unit 7 or the touch panel 6 is enlarged and displayed in the display area of the display unit 5. After step S127, the imaging device 1 proceeds to step S134 described below.

Figure 7:
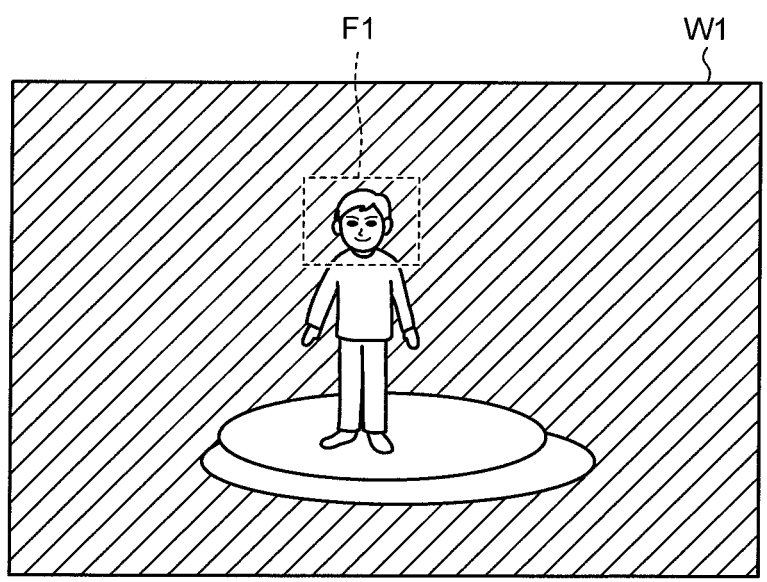
FIG. 7 is a view illustrating an exemplary super-resolution image played back and displayed on the display unit of the imaging device according to one embodiment of the present invention.

In step S128, the display controller 97 causes the display unit 5 to display one base image of the super-resolution image. Specifically, as illustrated in FIG. 7, the display controller 97 causes the display unit 5 to display, as the one base image, an image W1 corresponding to normal image data included in an image file of the super-resolution image.

Subsequently, the display controller 97 causes the display unit 5 to display a super-resolution image mark indicating that the image displayed on the display unit 5 is the super-resolution image such that the mark is superimposed on the image (step S129). Specifically, based on the area information included in the image file of the super-resolution image, the display controller 97 causes the display unit 5 to display a mark F1 corresponding to an area of the super-resolution image so as to be superimposed on the image W1. Accordingly, the user can intuitively grasp the area of the super-resolution image. In place of the mark F1, the display controller 97 may also cause the display unit 5 to display a character, a figure, and the like to indicate the super-resolution image.

Then, when image enlargement for enlarging a part of the image displayed on the display unit 5 is made through the operational unit 7 (step S130: Yes) and if a super-resolution area exists within an angle of view (area) after the enlargement (step S131: Yes), the super-resolution processer 95 makes the enlargement by pixel interpolation using a plurality of super-resolution images stored in the image file (step S132).

Subsequently, the display controller 97 causes the display unit 5 to display an enlarged image obtained by the pixel interpolation by the super-resolution processer 95 (step S133).

Then, when an operation to end the playback is performed through the operational unit 7 (step S134: Yes), the imaging device 1 proceeds to step S117. In contrast, if the operation to end the playback is not performed through the operational unit 7 (step S134: No), the imaging device 1 returns to step S124 described above.

In step S130, if the image enlargement for enlarging a part of the image displayed on the display unit 5 through the operational unit 7 is not made (step S130: No), the imaging device 1 proceeds to step S134.

In step S131, when no super-resolution area exists within the angle of view (area) after the enlargement (step S131: No), the super-resolution processer 95 makes the enlargement by pixel interpolation using a pixel in the angle of view (step S135). After step S135, the imaging device 1 proceeds to step S133.

In step S123, if the imaging device 1 is not set to the shooting mode (step S123: No), the imaging device 1 proceeds to step S117.

According to the embodiment described above, while the touch position is maintained, the position controller 93 moves the imaging element 22, the trimming unit 94 generates the trimming image data by sequentially cutting out the area including the touch position from the image data sequentially generated by the imaging element 22, and the super-resolution processer 95 generates the super-resolution image data using the plurality of pieces of trimming image data sequentially generated by the trimming unit 94, whereby it is possible to obtain the high resolution image reflecting the intention of the user in real time.

Furthermore, according to the embodiment, while the touch position is maintained, since the trimming unit 94 generates the trimming image data by sequentially cutting out only the area including the touch position from the image data sequentially generated by the imaging element 22, it is possible to reduce an amount of calculation by comparing the super-resolution image data of a full area, whereby it is possible to obtain the high resolution image reflecting the intention of the user in real time.

According to the embodiment, if the determination unit 92 determines that the number of pixels of the super-resolution image exceeds the resolution of the optical system 21, the imaging controller 96 ends generation of the super-resolution image data by the super-resolution processor 95, whereby it is possible to prevent useless image capturing.

Figure 8:
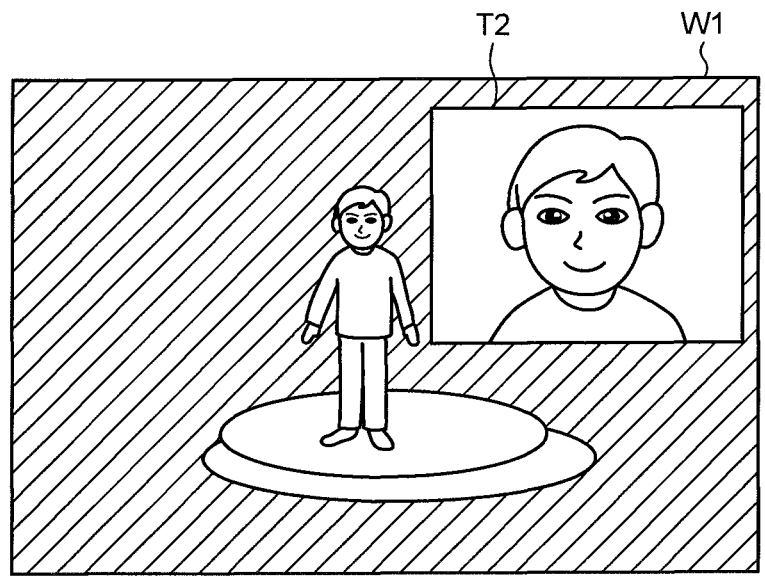
FIG. 8 is a view illustrating another exemplary super-resolution image played back and displayed on the display unit of the imaging device according to one embodiment of the present invention.
Figure 9:
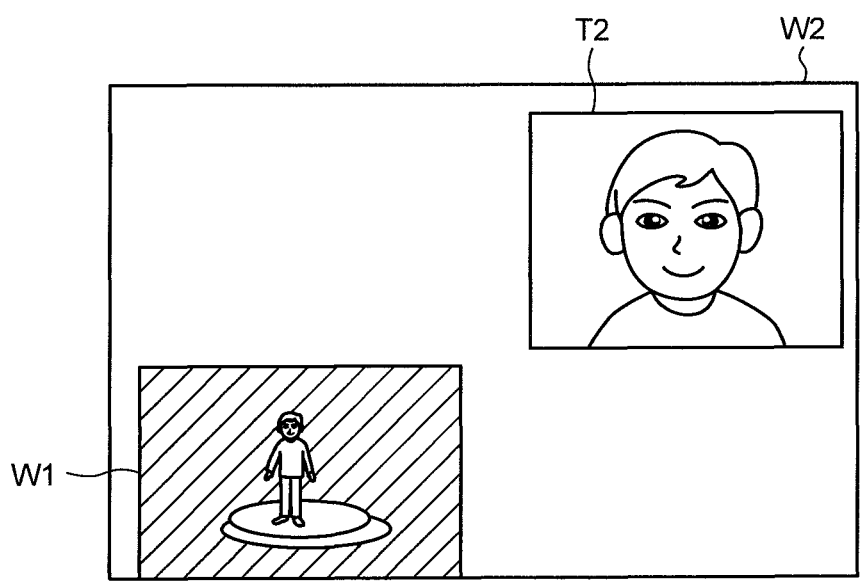
FIG. 9 is a view illustrating another exemplary super-resolution image played back and displayed on the display unit of the imaging device according to one embodiment of the present invention.

In this embodiment, if the image displayed on the display unit 5 is the super-resolution image, the display controller 97 causes the display unit 5 to display the super-resolution image mark so as to be superimposed on the image; however, for example, as illustrated in FIG. 8, it is also possible to display the super-resolution image T2 on the display unit 5 so as to be superimposed on the image W1. Furthermore, as illustrated in FIG. 9, it is also possible to display the image W1 and the super-resolution image T2 separately on the display unit 5 at the same time.

In addition to a digital still camera, the imaging device according to the embodiment may also be applied to a digital video camera, an electronic device such as a cellular phone and a tablet type mobile device with an imaging function, a display device that displays an image corresponding to image data used in in medical and industrial fields imaged by an endoscope and a microscope, and the like. Since it is possible to enlarge any part the image for confirmation that the user is concerned about, it may be a useful interface especially for an inspection device and the like. It is also possible to increase sensitivity by downsizing the device and by virtually increasing an area of a pixel without uselessly increasing the number of pixels.

The program to be executed by the imaging device is provided as file data in an installable format or an executable format and is recorded in a computer-readable recording medium such as a CD-ROM, a flexible disk (FD), a CD-R, a digital versatile disk (DVD), a USB medium, a flash memory, and the like.

The program to be executed by the imaging device may be stored in a computer connected to a network such as the Internet and may be provided by downloading through the network. The program to be executed by the imaging device may be provided or distributed through the network such as the Internet.

Note that in the description of the flowchart herein, expressions such as "first", "then", and "subsequently" have been used to specify the order of processing between the steps; however, the order of the processing required for carrying out the present invention is not to be uniquely determined by these expressions. That is, the order of the processing in the flowchart described herein may be changed as long as there is no contradiction.

According to some embodiments, it is possible to obtain a high resolution image reflecting the intention of the user in real time.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. An imaging device comprising:
an optical system configured to image an object;
an imaging element configured to receive light of an object image of the object formed by the optical system and to continuously generate image data of the object;
a position changing unit configured to change a relative positional relationship between the optical system and the imaging element relative to a surface orthogonal to an optical axis of the optical system;
a display unit configured to display an image corresponding to the image data generated by the imaging element;
a touch panel that is provided so as to overlap on a display area of the display unit and is configured to detect a contact position where an external body touches the touch panel and to periodically output a position signal according to the contact position;
a position controller configured to control the position changing unit based on a period of time during which the contact position is maintained, and thereby to change the relative positional relationship between the optical system and the imaging element per a predetermined distance;
a trimming unit configured to generate a plurality of pieces of trimming image data by sequentially cutting out an area including a touch position corresponding to the position signal from the image corresponding to the image data sequentially generated by the imaging element each time the relative positional relationship between the optical system and the imaging element is changed; and
a super-resolution processor configured to perform pixel interpolation using the plurality of pieces of trimming image data sequentially generated by the trimming unit, and thereby to generate super-resolution image data having a higher resolution than a resolution of each trimming image data.

2. The imaging device according to claim 1, further comprising a display controller configured to cause the display unit to enlarge and display a super-resolution image corresponding to the super-resolution image data generated by the super-resolution processor according to duration of the position signal output from the touch panel.

3. The imaging device according to claim 1, further comprising:
a determination unit configured to determine whether or not the number of pixels of a super-resolution image corresponding to the super-resolution image data generated by the super-resolution processor exceeds a resolution of the optical system based on the super-resolution image data generated by the super-resolution processor; and
an imaging controller configured to cause the super-resolution processor to end generation of the super-resolution image data if the determination unit determines that the number of pixels of the super-resolution image exceeds the resolution of the optical system.

4. An imaging method executed by an imaging device, the imaging device comprising: an optical system configured to image an object; an imaging element configured to receive light of an object image of the object formed by the optical system and to continuously generate image data of the object; a position changing unit configured to change a relative positional relationship between the optical system and the imaging element relative to a surface orthogonal to an optical axis of the optical system; a display unit configured to display an image corresponding to the image data generated by the imaging element; and a touch panel that is provided so as to overlap on a display area of the display unit and is configured to detect a contact position where an external body touches the touch panel and to periodically output a position signal according to the contact position, the method comprising:

controlling the position changing unit based on a period of time during which the contact position is maintained to change the relative positional relationship between the optical system and the imaging element per a predetermined distance;

generating a plurality of pieces of trimming image data by sequentially cutting out an area including a touch position corresponding to the position signal from the image corresponding to the image data sequentially generated by the imaging element each time the relative positional relationship between the optical system and the imaging element is changed; and performing pixel interpolation using the plurality of pieces of trimming image data to generate super-resolution image data having a higher resolution than a resolution of each trimming image data.

5. A non-transitory computer-readable recording medium with an executable program stored thereon, the program instructing an imaging device comprising: an optical system configured to image an object; an imaging element configured to receive light of an object image of the object formed by the optical system and to continuously generate image data of the object; a position changing unit configured to change a relative positional relationship between the optical system and the imaging element relative to a surface orthogonal to an optical axis of the optical system; a display unit configured to display an image corresponding to the image data generated by the imaging element; and a touch panel that is provided so as to overlap on a display area of the display unit and is configured to detect a contact position where an external body touches the touch panel and to periodically output a position signal according to the contact position, to execute:

controlling the position changing unit based on a period of time during which the contact position is maintained to change the relative positional relationship between the optical system and the imaging element per a predetermined distance;

generating a plurality of pieces of trimming image data by sequentially cutting out an area including a touch position corresponding to the position signal from the image corresponding to the image data sequentially generated by the imaging element each time the relative positional relationship between the optical system and the imaging element is changed; and performing pixel interpolation using the plurality of pieces of trimming image data to generate super-resolution image data having a higher resolution than a resolution of each trimming image data.

* * * * *